United States Patent Office 2,855,340
Patented Oct. 7, 1958

2,855,340

COMPOSITIONS CONTAINING A TETRACYCLINE-TYPE ANTIBIOTIC AND TEREPHTHALIC ACID

Robert E. Kent, Waterford, Conn., and Elwin H. Peterson, Terre Haute, Ind., assignors to Chas. Pfizer & Co., Inc., Brooklyn, N. Y., a corporation of Delaware No Drawing. Application March 4, 1957
Serial No. 643,546

8 Claims. (Cl. 167—53)

This invention is concerned with certain novel compositions which are highly useful in the treatment of animals both to stimulate an increased rate of growth and to cure infectious diseases. This invention is also concerned with the method of treating animals, particularly non-ruminant animals like poultry, swine and dogs, with these novel compositions. It is also particularly concerned with animal feeds of a new type containing certain antibiotics which are of value in obtaining increased absorption and effectiveness of the antibiotics.

Certain antibiotics are effective both in controlling infectious diseases and also in stimulating the growth of animals, when added in very limited amounts to their feed or drinking water. In particular, the broad spectrum antibiotics, oxytetracycline, chlortetracycline and tetracycline, have been used for this purpose. However, these antibiotics are relatively expensive and there is some waste involved in their use, since they are not completely absorbed from the alimentary tract. It is most important commercially to obtain compositions which would permit the effectiveness of these antibiotics to be appreciably enhanced.

It has been found that this most desirable object is achieved with novel compositions of a tetracycline-type antibiotic, that is, any antimicrobially active form of the antibiotics tetracycline, oxytetracycline, chlortetracycline and structurally related substances and terephthalic acid. Such compositions are highly useful for administration to domesticated animals in feeds or directly as a medicinal agent. These compositions show remarkably enhanced absorption of the antibiotic, resulting in much higher concentrations in the blood of the animals, with the use of a given amount of the antibiotic, or conversely resulting in equivalent blood levels with much less of the antibiotic compound than it is possible to obtain with the antibiotic alone.

Tetracycline is characterized by a tetracyclic nucleus, also common to oxytetracycline and chlortetracycline. Oxytetracycline, chlortetracycline and bromtetracycline structurally differ from one another and from tetracycline primarily in that oxytetracycline contains a nuclear hydroxy group that neither tetracycline nor chlortetracycline nor bromtetracycline possesses, while chlortetracycline contains a nuclear chlorine atom and bromtetracycline a nuclear bromine atom, neither of which oxytetracycline or tetracycline possesses. Oxytetracycline can be recovered from the metabolism products of *Streptomyces rimosus*, as more fully described in U. S. Patent 2,516,080 to Sobin et al., issued July 18, 1950, and referring to the antibiotic by its registered trademark "Terramycin." Chlortetracycline in turn can be recovered from the metabolism products of *Streptomyces aureofaciens*, as described in U. S. Patent 2,482,055 to Duggar, issued September 13, 1949, and referring to the antibiotic by its trademark "Aureomycin." Tetracycline is described and claimed in U. S. Patent 2,699,054 to Conover, issued January 11, 1955.

The expression "a tetracycline-type antibiotic" as used herein means an antibiotic characterized by the aforesaid tetracycline nucleus, and refers not only to free or ampthoteric oxytetracycline, chlortetracycline, bromtetracycline and tetracycline, but also to their various antibiotically active salts. Such salts include the calcium chloride and other similar complexes, sulfates, hydrochlorides, the sodium, potassium, magnesium and calcium salts, quaternary ammonium salts and the like.

Generally only a limited proportion of the terephthalic acid compound is necessary to achieve the remarkable increases in antibiotic absorption realized by this invention. Most successful results are usually achieved by employing between about 0.10 and 0.50 part by weight per 100 parts by weight of the feed. However, somewhat lower or substantially higher proportions of the terephthalic acid compound may also be used satisfactorily, say from about 0.05 to about 2.0 parts by weight per 100 parts by weight of the feed. A variety of animals including, in particular, poultry, but also including rabbits, rats, dogs, and other higher, non-ruminant animals, are favorably affected by the compositions of the present invention; that is, the blood levels achieved by the oral administration of the antibiotic are greatly enhanced. Obviously, the terephthalic acid can be administered either before or after the administration of the antibiotic, so long as the time interval is not excessive, that is, not greater than about 10 to 20 minutes. It is however, preferred to use both the antibiotic and the terephthalic in a balanced feed composition.

Various other materials may be present in addition to these active components. For intance, the tetracycline-type antibiotic and the terephthalic acid compound may be made up in a unit dosage form, e. g. tablets or capsules, with excipients and diluents such as sugars, starches, and the like. These may then be used directly or, preferably, for addition to animal feeds. The compositions may also be merely blended in the form of powders for incorporation in feeds. In general, at least about 10 p. p. m. of the tetracycline-type antibiotic is used in the animal feed to achieve the desired effect. Higher levels such as 100 to 200 p. p. m. are suitable and, in some cases, are more desirable, particularly when a group of animals exposed to an infection is to be fed. Levels of as high as 1000 p. p. m. of the antibiotic and even higher have been used and the favorable effect of terephthalic acid is observed even at such high levels.

When the new products are to be administered in feeds, an animal feed composition may be prepared containing the usual nutritionally-balanced quantities of carbohydrates, proteins, vitamins and minerals, together with the antibiotic-terephthalic acid material. Some of these usual dietary elements are grains, such as ground grain and grain by-products; animal protein substances, such as those found in fish meal and meat scraps; vegetable proteins like soybean oil meal or peanut oil meal; vitaminaceous materials, e. g. vitamin A and D mixtures; riboflavin supplements and other vitamin B complex members; and bone meal and limestone to provide minerals. A type of conventional feed material in the case of poultry which is often preferred in the operation of this invention is one which follows generally the suggested formulae set forth on page 6 of the authoritative pamphlet issued by the National Research Council (Washington, D. C., June 1944) and entitled "Recommended Nutrient Allowances for Poultry." For instance, feed compositions are recomemnded to contain roughly between 50% and 80% of grains, between 3% and 10% of animal protein, between 5% and 30% of vegetable protein, between 2% and 4% of minerals, together with supplementary vitaminaceous sources.

It has been found that the use of the terephthalic acid-antibiotic enriched feeds is of distinct and unusual value in treating animals to prevent or alleviate certain diseases. For instance, this has proven valuable for the treatment of poultry infected with synovitis, a serious, economically important disease. Appreciably better results are obtained than with feeds merely containing the antibiotic.

It has been found that certain other organic acids may be employed in lieu of the terephthalic compound. Especially contemplated are acids structurally related to terephthalic acid.

The following examples are given by way of illustration and are not to be regarded as a limitation of this invention, many variations of which are possible without departing from its spirit or scope.

*Example I*

Twenty adult chickens were each administered an aqueous solution containing 2.50 mg. of terephthalic acid and 200 mg. of oxytetracycline hydrochloride. After four hours blood samples were taken from the birds and the oxytetracycline content of the blood was determined. It was found that the blood of these animals averaged approximately 10 micrograms per milliliter. In contrast to this blood level, animals which were treated merely with the oxytetracycline hydrochloride were found to have a blood level of only approximately 3 micrograms per milliliter.

This procedure was twice repeated, employing chlortetracycline hydrochloride in lieu of the oxytetracycline salt in the one instance and tetracyline hydrochloride in the other. In each case similar markedly increased blood levels were attained.

*Example II*

The particular value of the present invention in treating synovitis, an economically important disease of the respiratory tract of poultry, was demonstrated by the following experiment. A flock of infected chickens was fed with a highly nutritious feed containing 100 p. p. m. of oxytetracycline and 0.3% by weight of terephthalic acid. It was found that the synovitis infection was much more rapidly cleared on this diet as compared to a flock of equal size in which the feed was identical but did not include terephthalic acid.

*Example III*

A series of groups of five chicks were fed on a standard nutritious diet containing 1000 p. p. m. of oxytetracycline. The first group of chicks received no terephthalic acid in the diet. The average oxytetracycline blood level of the birds after 24 hours of such feeding was 0.56 microgram per milliliter. The second group of chicks was fed on the identical diet but containing 0.05% terephthalic acid. The average antibiotic blood level was 0.68 microgram per milliliter. A third flock was fed the same diet containing 0.1% terephthalic acid. The average blood level was 0.69 microgram per milliliter. A fourth group was fed a diet with 0.3% terephthalic acid. The average blood level was 0.94 microgram per milliliter. A further group was fed the same diet with 0.5% terephthalic acid. The average blood level was 0.97 microgram per milliliter. Thus, it can be seen that there was a very definite increase in the rate of absorption of the antibiotic in the presence of terephthalic acid. A corresponding increase in the effectiveness of the antibiotic in the alleviation of infectious diseases in the animals is observed. An identical effect is observed when chlortetracycline or tetracycline is used in the diet in place of oxytetracycline. This is also true of bromtetracycline.

What is claimed is:

1. A composition which comprises a tetracycline-type antibiotic and terephthalic acid.

2. A composition which comprises between 0.001 and 0.1 part by weight of a tetracycline-type antibiotic and between about 0.05 and 2.0 parts by weight of terephthalic acid.

3. A growth-accelerating animal feed which comprises a nutritionally-balanced animal feed to which is added a tetracycline-type antibiotic and terephthalic acid.

4. A growth-accelerating animal feed which comprises grain, animal protein, vegetable protein, vitamins, minerals, a tetracycline-type antibiotic and terephthalic acid.

5. A therapeutically effective and growth-accelerating animal feed which comprises a standard feed composition containing substantially between 50% and 80% of grains, between 3% and 10% of animal protein, between 5% and 30% of vegetable protein, between 2% and 4% of minerals, together with supplementary, vitaminaceous sources, between 10 and 1000 parts per million of a tetracycline-type antibiotic and between 0.05 and 2.0 parts per hundred of terephthalic acid.

6. A composition according to claim 1 wherein the tetracycline-type antibiotic is oxytetracycline.

7. A composition according to claim 1 wherein the tetracycline-type antibiotic is tetracycline.

8. A composition according to claim 1 wherein the tetracycline-type antibiotic is chlortetracycline.

No references cited.

UNITED STATES PATENT OFFICE
CERTIFICATE OF CORRECTION

Patent No. 2,855,340                                          October 7, 1958

Robert E. Kent et al.

It is hereby certified that error appears in the above numbered patent requiring correction and that the said Letters Patent should read as corrected below.

Column 3, line 38, for "respiratory tract" read -- tendons --.

Signed and sealed this 3rd day of April 1962.

(SEAL)
Attest:

ERNEST W. SWIDER
Attesting Officer

DAVID L. LADD
Commissioner of Patents